Feb. 28, 1939. W. C. SHANLEY 2,148,968
PLUMBING SYSTEM
Filed July 28, 1934 4 Sheets-Sheet 1
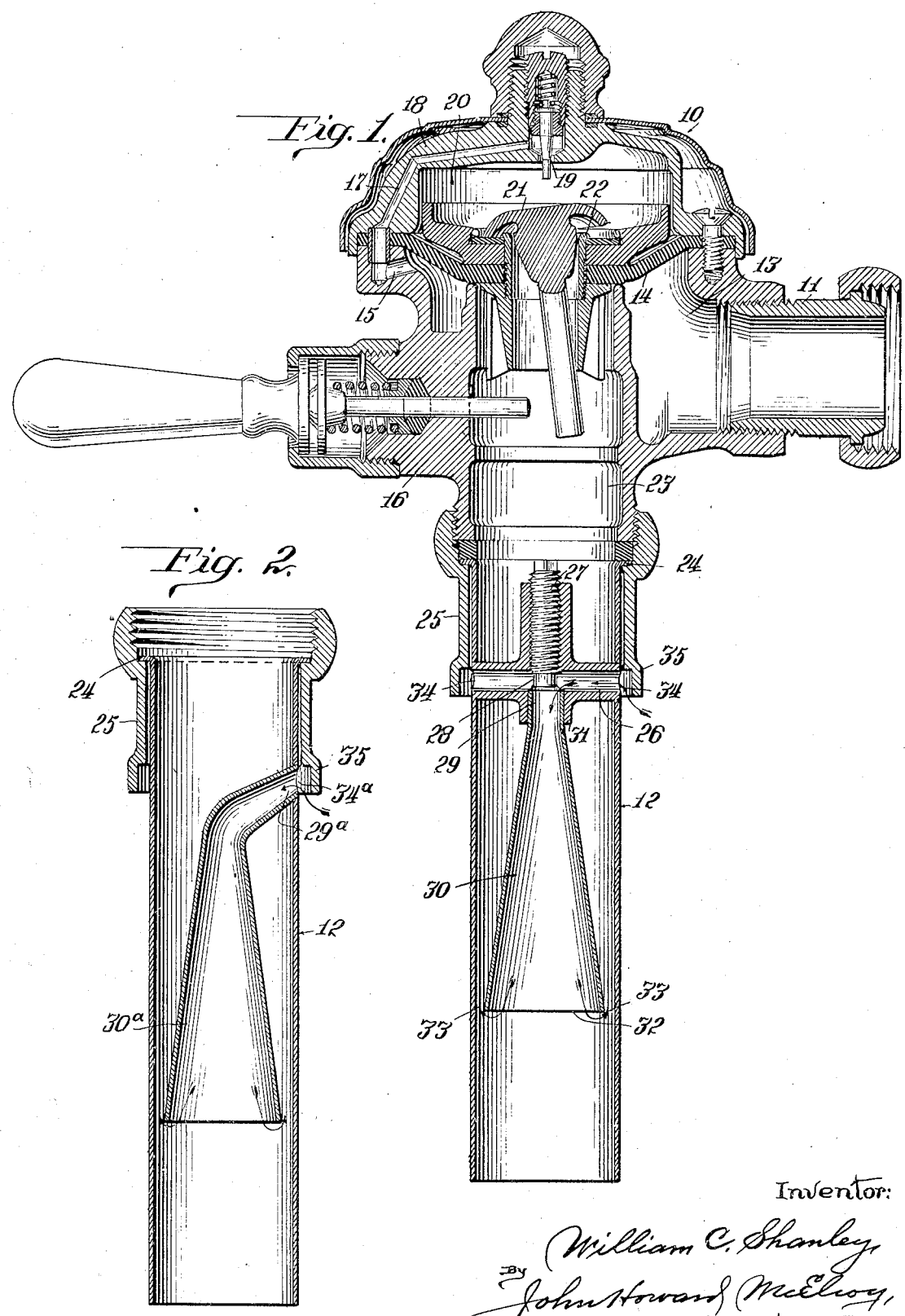
Inventor:
William C. Shanley,
By John Howard McElroy,
his Attorney.

Feb. 28, 1939.  W. C. SHANLEY  2,148,968
PLUMBING SYSTEM
Filed July 28, 1934  4 Sheets-Sheet 2
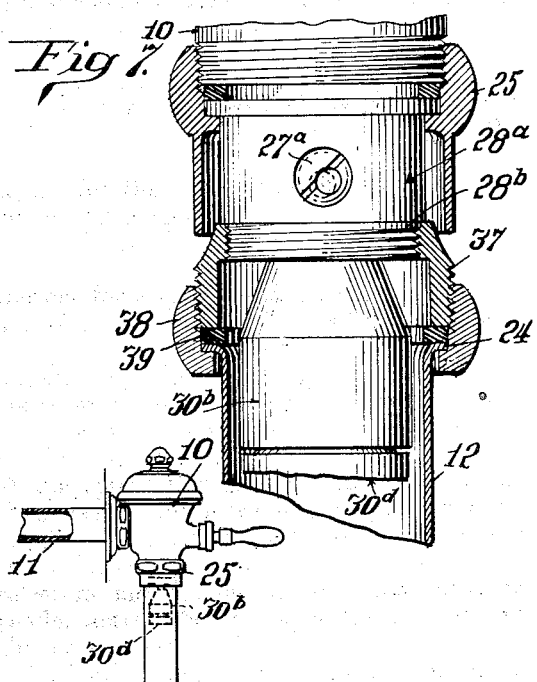
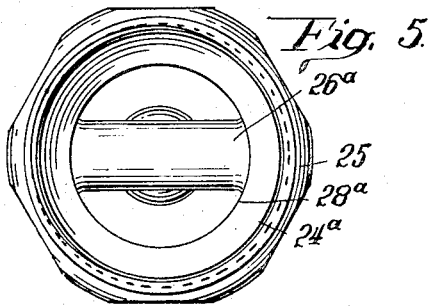
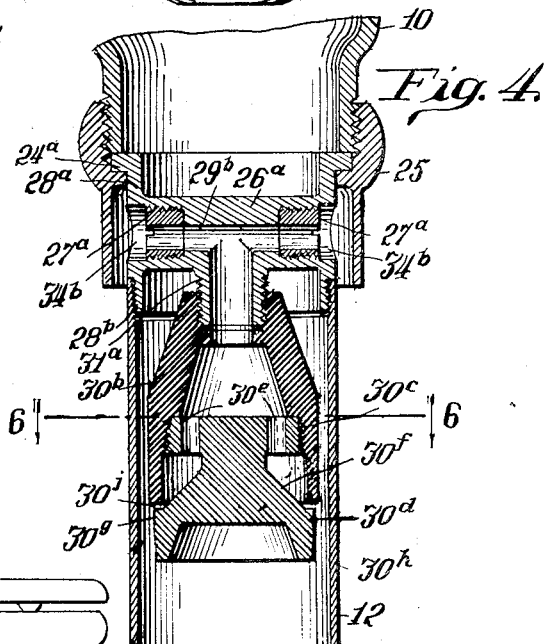
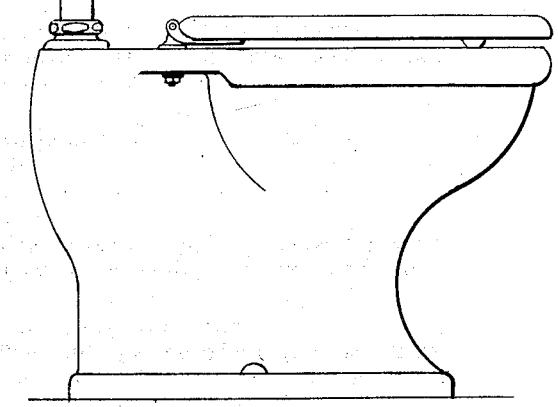
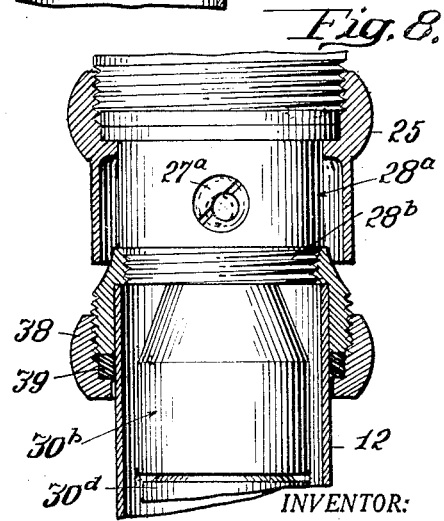
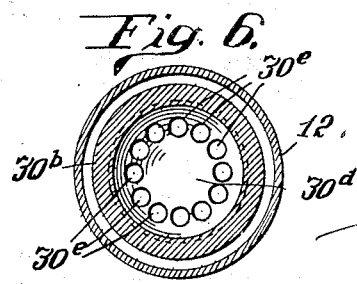
INVENTOR:
William C. Shanley,
BY John Howard McElroy
his ATTORNEYS.

Feb. 28, 1939. W. C. SHANLEY 2,148,968
PLUMBING SYSTEM
Filed July 28, 1934 4 Sheets-Sheet 3
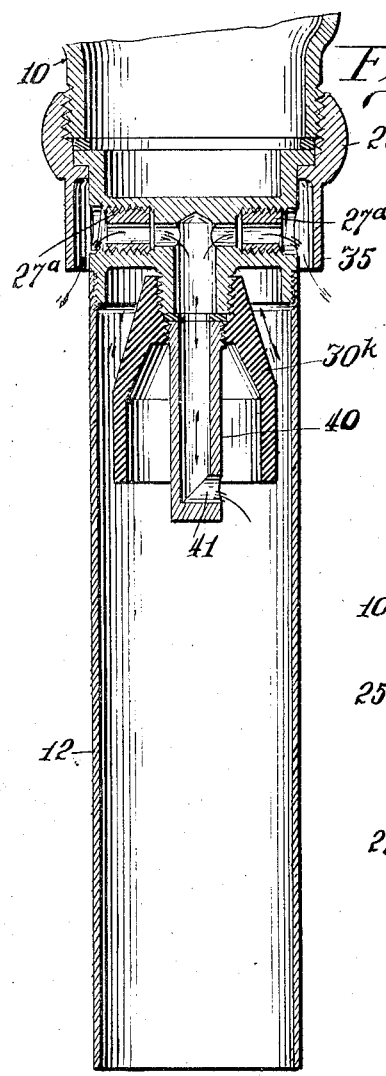
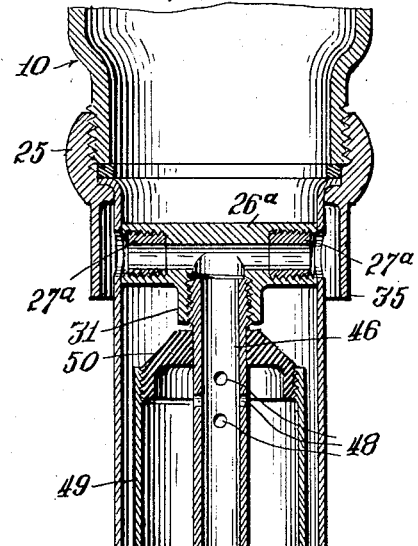
Inventor:
William C. Shanley,
By John Howard McElroy
his Attorney Feb. 28, 1939. W. C. SHANLEY 2,148,968
PLUMBING SYSTEM
Filed July 28, 1934 4 Sheets—Sheet 4
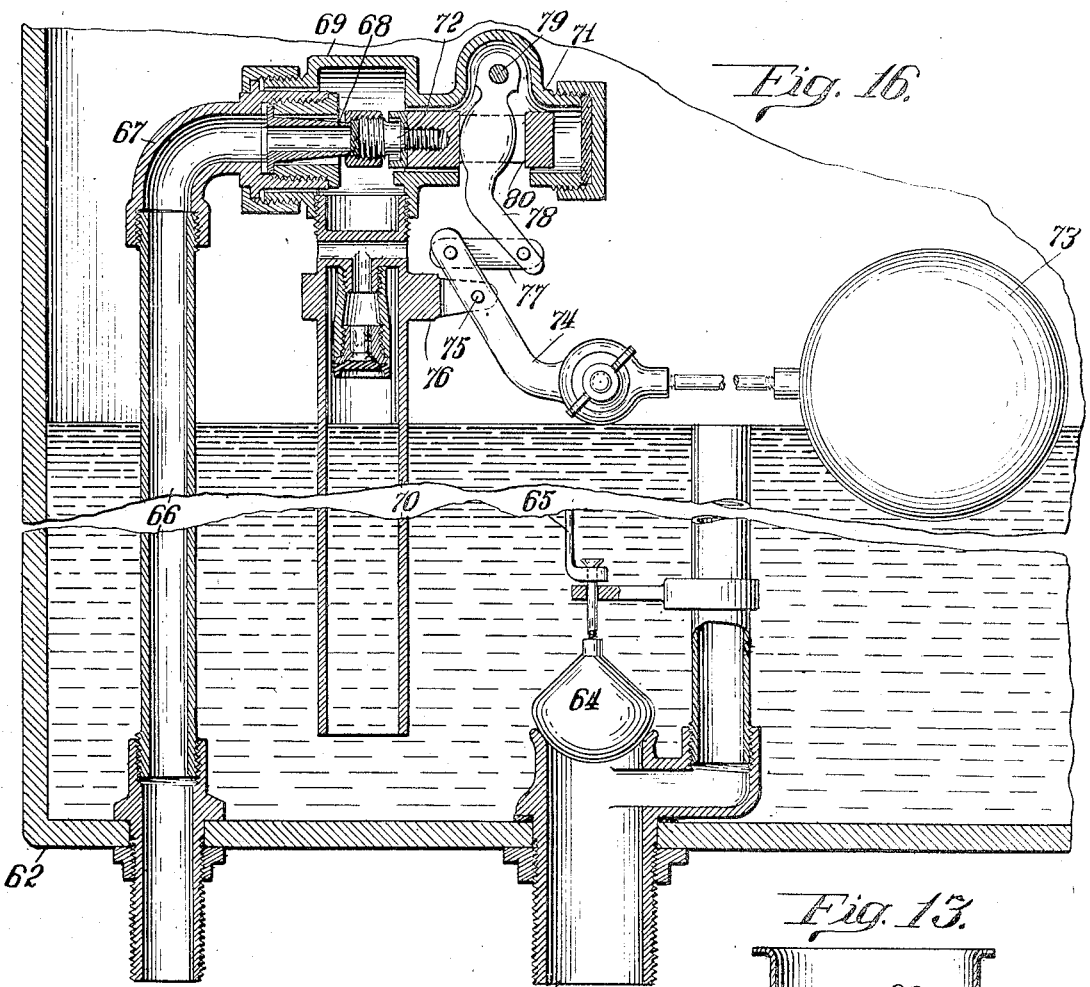

Patented Feb. 28, 1939

2,148,968

UNITED STATES PATENT OFFICE 2,148,968

PLUMBING SYSTEM

William C. Shanley, Chicago, Ill., assignor to The Imperial Brass Manufacturing Company, Chicago, Ill., a corporation of Illinois Application July 28, 1934, Serial No. 737,463

10 Claims. (Cl. 137—111)

My invention is concerned with plumbing systems, and more especially with such a system where a vacuum breaker, so-called, is used for the prevention of back siphonage through flush valves used on water-closet bowls, bed-pan closets, bidets, bed-pan washers, slop sinks and any other type of fixture that flush valves may be used on, or on any sterilizing tank or receptacle where the supply pipe or hose is submerged in the fluid.

It is well known that in the ordinary plumbing system where a supply pipe rises through several floors, a vacuum may be created therein, for instance, by shutting off the water supply and opening faucets, valves, etc., or flushing closets at a lower level. When this occurs, the water will siphon out of the water-closet bowl, bed-pan closet, bidet, bed-pan washer or slop sink, when the bowl is clogged through stoppage and the water level is above the holes in the rim of the bowl. It will also occur on side spud closet bowls where the closet spud is partially or completely submerged in the water seal, which is the normal water level in the closet bowl. When back siphonage occurs, it pollutes the water in the supply line.

In carrying out my invention in the forms shown herein, and where it is used in connection with a flush valve, I employ as a part of the conduit connecting the supply line with the receptacle which may be siphoned, a pipe connecting the bottom of the flush valve with the bowl, in which pipe is an aperture protected by means in the pipe so that it permits the downward passage of the water from the supply pipe through the flush valve and down through the pipe without the possibility of any of it escaping through the aperture, while said means permits the air to enter freely through the aperture in case a vacuum occurs in the supply, and thus prevents the possibility of the contents of the bowl being sucked back into the supply pipe, thereby possibly contaminating its contents.

A further feature of my invention resides in constructing the means in the conduit for preventing back siphoning so that it will also have the function of lessening the noise of the discharge of the water through the valve and to the closet. While I have shown this construction as a part of the means for protecting the system from back siphoning it will be understood that it might be employed independently of such means.

To illustrate my invention, I annex hereto four sheets of drawings in which the same reference characters are used to designate identical parts in all the figures, of which,—

Fig. 1 is a vertical section through one type of flush valve having my invention applied thereto;

Fig. 2 is a sectional view of a still more simplified form of my novel vacuum breaker and silencer;

Fig. 3 is a view in side elevation, on a smaller scale, showing the complete system;

Fig. 4 is a central vertical section showing the preferred form in which I have embodied my invention;

Fig. 5 is a top plan view of the structure shown in Fig. 4, with the flush-valve casing omitted;

Fig. 6 is a horizontal section on the line 6—6 of Fig. 4;

Fig. 7 is a view, partly in section, of the structure shown in Fig. 4, with an "adapter" added by which my invention may be employed in systems already installed;

Fig. 8 is a view similar to Fig. 7, but showing the adapter used in a connection pipe and employing the flange shown in Fig. 7;

Fig. 9 is a central vertical section of another specific form of my generic invention;

Figs. 10 and 11 are central vertical sections of two other specific forms;

Fig. 12 is a section on the line 12—12 of Fig. 11;

Figs. 13 and 14 are central vertical sections of two other specific forms;

Fig. 15 is a view of the form shown in Fig. 14 with a different stream contracting element substituted for use with blow-out bowls; and Fig. 16 shows the specific form of vacuum breaker shown in Fig. 4 applied to a water-closet tank.

In Fig. 1, I have shown a common type of flush valve 10 with its connection to a supply line 11 (as seen in Fig. 3), and with a connection pipe 12 which opens in the customary manner to the top of the ordinary closet bowl, likewise shown in Fig. 3. With this type of flush valve, in case a vacuum occurs in the supply pipe, it tends to extend through the connection 11, the chamber 13 in the valve below the diaphragm 14, through the passage 15 in the lower half 16 of the valve casing, and through the passage 17 in the upper half 18 of the valve casing, and down through the self-cleansing regulating valve 19 shown to the upper chamber 20, where the vacuum might tilt the relief valve 21 as indicated by its position, after the water in the chamber 20 has been sucked out into the supply pipe, and then pass the relief-valve seat 22, and on down through the discharge passage 23, through the connection tube 12, and thence to the closet bowl, from which it tends to siphon its contents if it is clogged and the water stands above the holes in the rim, and if no vacuum breaker is employed.

In the form shown in Fig. 1, the connection tube 12 has at its upper end the horizontal flange 24 by which it is held against the annular bottom of the valve casing 16 by the connecting sleeve 25 screwed onto said bottom. In the specific form shown, I secure in the walls of the tube 12 a transverse tube 26, which has the general form of an inverted cross, with its upper vertical portion internally threaded to receive the adjusting screw 27, the reduced lower end 28 of which is adapted to co-operate with the small upper end 29 of the flaring tube 30 secured in the boss 31 constituting the lower part of the transverse tube. The lower, large end 32 of the flaring tube 30 comes almost to the inner circumference of the connection tube 12, forming an annular passage 33 between the flaring tube and the connection tube, which passage is sufficient to allow a free flow of water downward during the flushing operation, but which materially reduces the effective cross-sectional area of the tube, thereby materially reducing the noise caused by the passage of the water. The ends of the transverse tube 26 form, as it were, a pair of apertures 34 in the connection tube, which apertures are preferably protected by the hood-like flange 35 formed on the bottom of the connecting sleeve 25.

When the vacuum occurs and reaches the connection tube, and before the contents of the bowl can be siphoned, it is broken by reason of air entering the apertures 34, as indicated by the arrows, passing downward through the flaring tube 30 and up through the annular passage 33, thus instantly relieving the vacuum and preventing the possibility of the contents of the bowl being sucked back into the supply pipe.

In Fig. 2, I show a simplified form in which the inclined small end 29ª of the flaring tube 30ª opens into the aperture 34ª in the side of the connection tube 12, the operation being the same as with the form shown in Fig. 1, except that it does not have the adjustable feature. This adjustment is advantageous in that it permits adjusting the effective area of the apertures 34 to meet the requirements of the various sized orifices in the different types of flush valves, and when the main valve-seat washer on the flush valves leak a half a gallon of water per minute at a working water pressure of eighty pounds, as is required by some of the city ordinances in various States, this regulation permits adjusting the size of the orifice so it will break a vacuum to meet the above-mentioned requirements with a minimum of noise, and, once set, has no movable parts.

In Figs. 3 to 6, inclusive, I have illustrated the preferred specific form of the various generic forms disclosed, in which specific form, the transverse tube 26ª is made integral with an annulus 28ª, which at its upper end has the flange 24ª by which it is held in place against the bottom of the valve casing by the connecting sleeve 25, as before. The lower end of the annulus 28ª is externally threaded, as at 28ᵇ, and the connection tube 12 is thereby screwed onto the annulus, as shown. The boss 31ª is externally threaded and has screwed thereon the Bakelite member 30ᵇ, which in part corresponds to the flaring tube 30 of Fig. 1. The member 30ᵇ preferably has its upper end tapered, as shown, while its lower end is cylindrical, and is close enough to the interior of the tube 12 so that it forms the same reduced annular passage for the same identical purpose, as occurs in the form shown in Fig. 1. The hollow interior is preferably tapered to below its central point, where it is internally threaded to receive the threaded upper end 30ᶜ of the plug 30ᵈ, which upper end is provided with the plurality of apertures 30ᵉ leading to the conical portion 30ᶠ of the plug, the lower end 30ᵍ of which is slightly less in diameter than the bottom of the member 30ᵇ. It preferably tapers slightly inward at its bottom, as seen at 30ʰ. When the parts are screwed in place, there is a small annular aperture 30ʲ between the bottom of the member 30ᵇ and the adjacent portion of the plug 30ᵈ. When the parts are assembled, as shown, there will be seen to be an air passage from the exterior through the passage 29ᵇ in the tube 26ª, downward through the apertures 30ᵉ and out through the aperture 30ʲ. The flow of water past this aperture 30ʲ sucks air through the passage formed in the elements 26ª, 30ᵇ and 30ᵈ, with the result of keeping the air passage free from any foreign matter which might tend to gather therein, and further to protect the air passage against any possible clogging, I form the plug 30ᵈ of Bakelite, as well as the member 30ᵇ, it being understood that if ordinary materials, such as brass, were employed, the chemicals with which city water is ordinarily treated to kill the bacteria would cause the brass to corrode and the apertures 30ᵉ and 30ʲ would tend to close, so that the apparatus would not be in condition to operate if the siphoning effect which it is designed to prevent should occur.

It is desirable in practice to regulate the amount of air that can pass through the apparatus, and for which purpose the screw 27, shown in Fig. 1, is employed. In the specific form shown in Fig. 4, the passage 29ᵇ is located eccentrically in the tube 26ª, and its ends are enlarged concentrically and internally threaded to receive the regulating plugs 27ª, which are externally screw-threaded and have the eccentric apertures 34ᵇ therein, preferably of the same size as the passage 29ᵇ. Slots for a screw-driver are placed in their outer ends, and when it is desired to adjust the effective area of the air passage, the plugs 27ª are turned as much as desired, and it will be obvious that as they are turned from a position in which the apertures 34ᵇ exactly register with the passage 29ᵇ, the effective area will be correspondingly reduced.

The specific arrangement shown in Fig. 4 is employed where the apparatus is originally installed with the flush valves. It frequently happens, however, that the apparatus must be installed in conducting tubes 12 already in place, and where the tube 12, as shown in Fig. 7, has the customary flange 24, enough of the length of the pipe is cut off from the bottom, and what I call the adapter 37, which has its upper reduced end internally threaded, is screwed onto the threaded lower end 28ᵇ of the annulus 28ª. The collar 38 is then screwed in place on the threaded exterior of the adapter, and its flange catches the flange 24 of the connection tube 12 and the packing ring 39 between it and the bottom of the adapter 37, with the final result that the parts operate just as shown in Fig. 4. Where the connection tube 12 does not employ the flange 24, as seen in Fig. 8, the necessary amount is cut off of its lower end and it is brought upward until its upper end contacts with the internal shoulder formed in the upper end of the adapter, and the collar 38 is screwed in place as before, the packing 39 being sufficiently compressed thereby to hold the parts with sufficient security.

In Fig. 9, I have shown a structure somewhat similar to that shown in Fig. 4, except that, instead of employing the plug 30ᵈ, I screw the tube 40, with the lateral outlet 41 at its lower end in the upper end of the member 30ᵏ, which has the same function as the member 30ᵇ of the specific form shown in Fig. 4. The arrows indicate the course of the air in breaking the vacuum, and the water falling past the outlet 41 which is just below the end of the member 30ᵏ, tends to draw air in through the tube 40, as before.

In Fig. 10, I show still another specific form, in which the eccentric members 27ᵃ are employed for the adjustment, and the vertical tube 46 is threaded into the boss 31 and has its lower end closed by the plug 47, and is supplied with the intermediate apertures 48. A cylindrical shell 49 surrounds the tube and is supported therefrom by the preferably tapered head 50, which closes its upper end, and the annulus 51 closing its lower end is spaced away from the bottom of the tube to leave the annular outlet 52 for the air.

In Fig. 11, I show still another modification, in which the eccentric screw members 27ᵃ might be employed for the adjustment, and in which a cylindrical shell 53 is suspended in the connection pipe 12 by the preferably truncated conical plug 54 closing the upper end of the shell and having its reduced upper end threaded into the boss 31. A disk 55 closes the bottom of the shell, which is provided near its center with the apertures 56, preferably sloping downward, and which are guarded by the hood 57 secured or formed on the outer surface of the shell 53 and determining the cross-sectional area of the tubular stream of water passing downward during the discharge of the valve.

In Fig. 13, I have illustrated still another specific form, in which the right-angled tube 60 let into the conduit 12 terminates in the tube 59 having the same function as the annulus 51, and it is supported by the flaring portion 61, which contracts the stream smoothly and noiselessly and takes the place of the flaring tubes 30, 30ᵃ, and 30ᵇ.

In Fig. 14, I have illustrated a preferred form of the vacuum breaker shown in Fig. 13, in which the annulus 28ᶜ has its upper end threaded directly into the lower end of the flush-valve casing 10, and has the sleeve 35ᵃ protecting the apertures 34 threaded onto the upper end of the annulus 28ᶜ against the bottom of the valve casing 10, with the sleeve 35ᵃ and the annulus 28ᶜ soldered to the casing 10 so that they cannot be removed. It sometimes happens that in ignorance of the function of the vacuum breakers not built into or permanently secured to the flush valve, they are removed and not replaced, leaving the device still operative but unprotected from pollution. If the flush valve must also be removed in getting rid of the vacuum breaker, the system would then be entirely inoperative and useless until another flush valve was installed, which, if up to date, would be provided with a vacuum breaker. The nipple 28ᵈ extends below the short flaring portion 61ᵃ of the generally tubular flow resisting member 59ᵃ, which has its upper end exteriorly threaded and screwed into the bottom of the annulus 28ᶜ, the operation of this form being the same as that shown in Fig. 13, but the restriction of the flow area not being so great as it is intended for general use instead of for blow-out bowls, as would be the case where the restriction is as great as in Fig. 13. In Fig. 15, I illustrate precisely the same construction as in Fig. 14, except that the flow restricting member 59ᵇ has the longer flaring portion 61ᵇ, which furnishes the same amount of restriction as that shown in Fig. 13, so it is adapted for blow-out bowls. In installing these devices, the member 59ᵃ or 59ᵇ will be employed as the situation demands.

My invention is equally useful as applied to the tank type of flushing or liquid level or storing means, and in Fig. 16, I have shown the specific form of vacuum breaker shown in Fig. 4 as applied to the customary tank 62 having the outlet 63 closed by the valve 64 lifted by the cord or wire 65 when the bowl is to be flushed. The supply pipe 66 terminates in the elbow 67 having the nozzle 68 forming a valve seat in the casing 69, likewise supported by the elbow 67, and in its turn supporting the filling pipe 70 depending therefrom. Mounted in the extension 71 of the casing 69 is the sliding valve 72 co-operating with the valve seat and controlled by the ball float 73 carried by the lever 74 fulcrumed at 75 on the bracket 76 carried by the filling pipe 70. Its load arm is connected by the link 77 with the lever 78 fulcrumed in the casing 71 at 79 and passing through a slot 80 in the valve 72. When the valve 64 is lifted and the water discharges until it reaches the top of the outlet 63, the ball float 73 falls, pulling the valve 72 away from its seat, and allowing the tank to fill until it reaches the level determined by the top of the overflow pipe 81, at which level the water holds the ball float 73 high enough to keep the valve 72 firmly seated and stop the inflow of water. The specific vacuum breaker shown in Fig. 4 is shown as secured in the pipe 70, just as in the conduit 12, and operating in precisely the same manner. Inasmuch as the filling pipe 70 extends below the lowest water level in the tank determined by the top of the outlet 63, the conditions for back siphoning are always present, making the vacuum breaker more important than where the modern flush valve, as shown in Fig. 1, is used with closets, as only in abnormal conditions are the discharge outlets into the bowl ever submerged so that its contents could be sucked up. The tanks are seldom, if ever, cleaned, and bacteria can thrive in the stagnant water always found in their bottoms, and every time a vacuum occurs in the supply line, there is a certainty of contamination if a vacuum breaker is not employed.

It will be noted that in all the foregoing forms, the water is discharged past the tubular member in a stream, annular in cross section, and having an area which does not exceed, and may be materially less than, fifty per cent. of the area of the connection tube, and that the downward flow of the water tends to draw a stream of air through the center of the tubular member and discharge the same with the flow of the water. Also that in case of a vacuum being produced in the supply pipe, which would cause a back-siphoning action, the air to relieve the vacuum passes into the connection tube the same as during a discharge, but in that case rises about the tubular member and enters the flush valve or ball-cock through which it passes to the supply pipe.

While I have shown and described my invention as embodied in the forms which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. As a new and useful article of manufacture for use in plumbing systems, a member through which water is discharged at intervals having an air-inlet in its side and a hollow inner portion consisting of a transverse tube extending across the member and having a longitudinally extending tube depending therefrom and opening thereinto, and a screw member having an eccentric aperture therein cooperating with an open end of the transverse tube to regulate the amount of air admitted therethrough.

2. As a new and useful article of manufacture for use in plumbing systems, a connection member through which water is adapted to be discharged for flushing at intervals having an air-inlet therein through which only air may intentionally enter the system and in its interior a tubular portion having its larger lower end leaving an annular space between said end and the inner wall of the connection member and its smaller upper end opening into a transverse tube which has an open end secured in the side of the connection member and registering with the air-inlet, said transverse tube having a screw member threaded into it so that the effective size of said air-inlet may be regulated.

3. As a new and useful article of manufacture for use in plumbing systems, a vacuum breaker and silencer adapted to be inserted in a connection forming part of a continuous conduit through which water passes and consisting of an annulus having a transverse tube therein with a nipple extending downwardly from the center thereof, a flaring shell extending downwardly from the nipple, and a plug substantially closing the bottom of the shell.

4. As a new and useful article of manufacture for use in plumbing systems, a vacuum breaker and silencer inserted in a connection tube and consisting of an annulus within which is a tubular member having an air-inlet opening through the annulus to the atmosphere, and having its lower larger end compelling the liquid passing through said annulus and connection tube to pass the member as a hollow stream of a cross-sectional area substantially less than that of the connection tube, and an adapter threaded on to the bottom of the annulus and having an external thread for the purpose described.

5. As a new and useful article of manufacture for use in plumbing systems, a member forming a part of a conduit through which water is discharged at intervals having an air-inlet in its side, and a tubular inner portion supported in the member and having its upper end connected to the air-inlet and its lower end serving to reduce the effective cross-sectional area of the conduit more than 40%, said tubular portion having an air passage through it terminating at its lower end in an annular aperture past which the water discharges, said annular aperture being formed by the bottom of the tubular portion proper and a plug carried thereby.

6. An article of manufacture as described in claim 5 in which the plug extends below said annular aperture and has a cylindrical periphery of slightly less diameter than the external diameter of the tubular member.

7. As a new and useful article of manufacture for use in plumbing systems, a connection member having in its interior a tubular portion having its lower end leaving an annular space between said end and the inner wall of the connection member, and its upper end connected with an air inlet through the side of the connection member, and means for controlling the effective size of the air inlet.

8. As a new and useful article of manufacture for use in plumbing systems to prevent accidental unwanted vacuums occurring above it, a connection member which, when assembled, forms part of a continuous conduit which has in its interior a tubular portion leaving an annular space for the passage of water between said tubular portion and the inner wall of the connection member and its smaller upper end opening into a transverse tube which has its open ends secured in the sides of the connection member.

9. As a new and useful article of manufacture for use in plumbing systems, a connection member having in its interior a tubular portion consisting of a transverse tube secured at its ends in the connection member and having depending therefrom a truncated conical shell, into the bottom of which is threaded a plug leaving a narrow adjustable annular air outlet between it and the bottom of the shell, said connection member having an air inlet opening into the transverse tube.

10. As a new and useful article of manufacture for use in plumbing systems, a vacuum breaker connection forming a part of a continuous conduit through which water flows at intervals, and consisting of a tubular portion having therein a downwardly projecting nipple directly connected when assembled to the atmosphere only through the side of the tubular portion, and having a funnel shaped portion therein surrounding the nipple and causing water to pass outside of the nipple in a hollow stream having a cross-sectional area substantially less than that of the tubular portion above it, said funnel shaped portion being removable and replaceable by a similar, but differently proportioned portion when a different pressure of water is to be used.

WILLIAM C. SHANLEY.